though it may be of satisfactory strength is preferably diluted so as to provide the optimum saturation at the top tray.

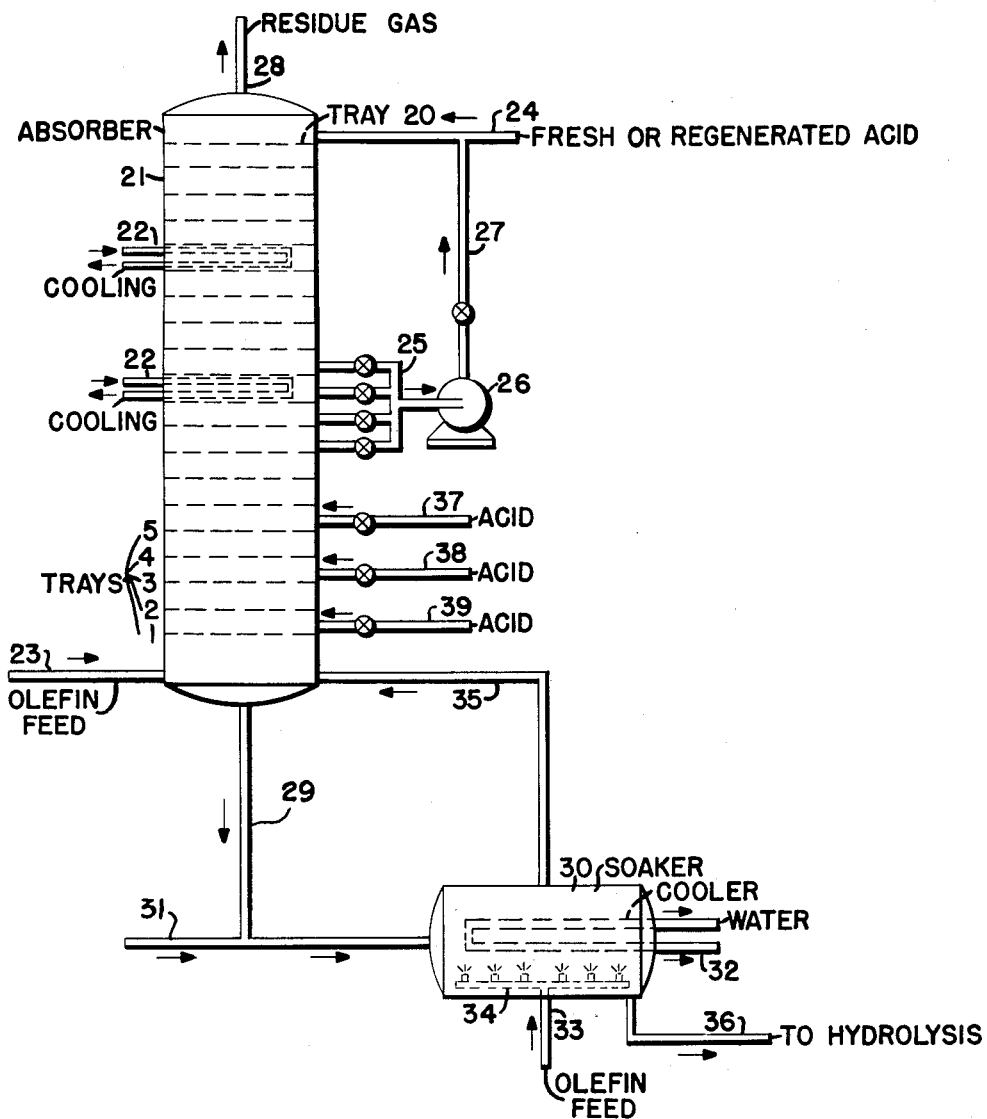

2,755,297

ACID ABSORPTION OF OLEFINS

Brook I. Smith, Elizabeth, N. J., and William H. Rader, Baton Rouge, La., assignors to Esso Research and Engineering Company, a corporation of Delaware Application December 11, 1952, Serial No. 325,410

5 Claims. (Cl. 260—460)

This invention relates to a method of controlling absorption of an olefin in a countercurrent stream of acid extract by introducing portions of fresh strong acid at a certain number of points in the system, also, by adding the portions of acid in certain relationship to the olefin feed and the withdrawal of extract for recycling.

The object of controlling absorption of the olefin by the acid is to equalize absorption rates so as to avoid peaks of excessive heat liberation, to maximize total absorption in a given reactor volume, and to minimize degradation of the olefin undergoing absorption.

In the manufacture of alcohols by use of a strong acid, ethylene or other low molecular weight $C_2$–$C_5$ olefin is first absorbed in a strong acid, generally concentrated $H_2SO_4$, to form an extract. The acid extract will comprise a mixture of sulfates together with some free sulfuric acid.

The kinds of processes to be improved by the present invention are described in U. S. Patents 2,474,568 and 2,474,569 of Bannon et al., U. S. Patent 2,350,558 of Kerns et al., U. S. Patent 2,541,673 of B. I. Smith et al., and others.

The monoethyl sulfate and diethyl sulfate will be present in the absorption of ethylene. The acid extract is diluted with water to an equivalent acid strength of 45–55 weight per cent $H_2SO_4$ (on a hydrocarbon-free basis) to hydrolyze the ethyl sulfate to alcohol and ether. The hydrolyzed extract is then distilled to recover the crude alcohol, which is subsequently finished by distillation and other purification techniques to obtain a specific ethanol or other alcohol depending on the olefin used.

The invention herein described involves particularly an improvement in the method of carrying out the absorption of the olefin by the acid. It can be understood better by first describing an absorption system which has been conventionally used and some of the associated difficulties.

The absorption system, which operates under about 300 to 400 p. s. i. g. pressure and at a temperature level of 160°–190° F. may comprise a countercurrent absorber tower having about 20 plates and a horizontal soaking drum or extract saturator. A main olefin feed is supplied to the absorber tower below the plates. Operating the process in a conventional manner, all the fresh acid, e. g. of about 94 to 98 weight per cent $H_2SO_4$ strength, would be introduced to the top tray or plate of the absorber. Then, even if some extract is admixed with the fresh acid introduced at the top of the absorber, certain difficulties are encountered unless positive steps for controlling the absorption are used.

To maintain the optimum extract saturation at the top tray, i. e. an extract saturation of 0.6 to 0.8 mole $C_2H_4/H_2SO_4$, a controlled amount of extract has to be recycled. The optimum saturation of the extract is one which permits a maximum absorption rate while at the same time the olefin content of the effluent gas is reduced to a low level, which is equivalent normally to 3 to 6 lbs./sq. in. ethylene partial pressure.

Proceeding downwardly in the absorber, ethylene absorption increases as the ethylene partial pressure in the gas phase increases until a maximum rate of absorption is reached near or just below the mid-section. It has been observed that at this point of maximum absorption rate the extract saturation tends to be of the order of .9 to 1.0 mole $C_2H_4$/mole $H_2SO_4$ and the olefin will begin to have exerted a pronounced back pressure. Furthermore, reaction of the ethylene and the acid will have released water which dilutes the remaining free acid.

It was found that the rate of absorption drops off rapidly below the zone of maximum absorption and consequently it was noted that in the lower part of the absorber, roughly about 1/3 to 1/2 of the tower, or that portion of the tower below the tray from which extract is withdrawn for recycling, contributes very little to further ethylene absorption.

It will be seen by noting the effect of the positive control steps, that while a small mid-portion of the absorber operates at very high rates of absorption, both the upper and lower portions normally operate at comparatively low rates. Thus, it was found desirable to maintain the absorption temperature in a rather narrow range; for example, in the range of 160° to 190° F. and preferably from about 170° to 180° F. This is best accomplished by use of internal coolers, such as a cooling coil or tube bundle on each tray, particularly if it is desirable to achieve a maximum saturation gradient. This saturation gradient would be reduced if cooling were accomplished only by recycling an extremely large volume of the extract from a bottom tray to an upper tray through an external cooler. The internal coolers located on the various trays or plates provide an advantageous way of cooling if absorption is controlled at a uniform rate on each plate. It is impractical to recycle extract from each tray through an external cooler.

The invention will be described in further detail with reference to the schematic flow plan of the absorption system shown in the drawing.

In the drawing, about twenty trays or plates; numbers 1, 2, 3, 4, 5 . . . 20 from the bottom up are present in absorber 21 to act as gas-liquid contacting means. The tray or plate may have perforations, bubble caps or other devices for increasing mixing of the gas with the downflowing acid. Internal cooling means which may be located above each tray is shown by the cooling tubes 22, in which cooling water can be circulated for indirect heat exchange with gas and liquid passing through the tower 21 at any number of desired stages.

The olefin gas feed, e. g. a dilute (20 to 40 mole per cent) ethylene stream, is passed into the bottom part of tower 21 from line 23 to flow upwardly through the series of plates 1 to 20.

Fresh or reconcentrated acid, e. g. 93–99% strength $H_2SO_4$, is passed by line 24 to the top part of tower 21 to flow downwardly from tray 20 countercurrently to the olefin gas which is made to flow upwardly in the tower 21.

The extract side stream withdrawal line 25 connected through pump 26 to recycle line 27 is a means for recycling a suitable amount of the acid extract from an intermediate part of the absorber tower 21 to an upper part of the tower 21. This recycled stream may be cooled if desired. The amount of the thus recycled extract and the composition of this portion of the extract can be controlled to regulate the saturation of the acid including freshly charged acid at the top of the tower 21.

Unreacted gas, depleted of the absorbed olefin, is withdrawn from the top of tower 21 by line 28. This residual gas should preferably have very little of the olefin left, e. g. about 2% or less ethylene.

The final extract product of the absorber tower 21 is withdrawn from the bottom thereof by line 29, and need not be returned to this absorber tower. If desired, this extract may be directly hydrolyzed. However, this extract is of suitable saturation for absorbing ethylene from a more concentrate ethylene stream, e. g. 60 to 80 mole per cent $C_2H_4$; and such additional saturation can be continued in the soaking vessel 30. Additional acid may be added by line 31 to the extract supplied to vessel 30.

The soaking vessel or soaker 30 is equipped with a cooling means such as an internal water fed cooling coil 32. The more concentrated olefin gas is fed to the soaker 30 by line 33 through a perforated tube 34 or equivalent gas-liquid contacting means, used as a gas distributor, to provide intimate contact of gas with the extract received from tower 21. The unabsorbed, dilute olefin gas may be passed from the soaker 30 by line 35 to the bottom of absorber tower 21 to supplement the olefin feed stream thereto. A final extract having a saturation of 1.3 to 1.5 moles ethylene per mole sulfuric acid, ready for the further steps of hydrolysis, is withdrawn by line 36 from soaker 30.

The subsequent steps of hydrolyzing the extract to form the alcohol, for recovering the alcohol and acid may be conventional and are of no specific concern to the present invention. Such steps are shown in the patents referred to.

In the preferred embodiment as illustrated by the drawing, the principle employed for enhancing absorption in the lower part of the absorber is a multipoint introduction of portions of the concentrated acid. Preferably, these added portions of acid are introduced at points below the side stream withdrawal of the extract which is to be recycled and which is close to the point of maximum absorption rate.

The following table compares the operation of the absorber with and without multipoint addition of fresh acid in the lower part of the absorber tower.

Table

| Tray | I—All Acid Added @ Top | | II—Multipoint Acid Addition | |
|---|---|---|---|---|
| | Extract Sat. | Moles $C_2H_4$ Abs./Hr. | Extract Sat. | Moles $C_2H_4$ Abs./Hr. |
| 20 (Top) | [1] 0.700 | 9.2 | [2] 0.700 | 9.2 |
| 19 | 0.704 | 11.2 | 0.704 | 11.2 |
| 18 | 0.707 | 14.1 | 0.707 | 14.1 |
| 17 | 0.713 | 17.7 | 0.713 | 17.7 |
| 16 | 0.719 | 22.3 | 0.719 | 22.3 |
| 15 | 0.728 | 28.4 | 0.728 | 28.4 |
| 14 | 0.738 | 35.1 | 0.738 | 35.1 |
| 13 | 0.751 | 43.3 | 0.751 | 43.3 |
| 12 | 0.767 | 52.7 | 0.767 | 52.7 |
| 11 | 0.787 | 59.3 | 0.787 | 59.3 |
| 10 | 0.806 | 69.7 | 0.806 | 69.7 |
| 9 | 0.834 | 75.9 | 0.834 | 75.9 |
| 8 | 0.915 | 69.0 | 0.915 | 69.0 |
| 7 | 1.058 | 42.4 | 1.038 | 42.4 |
| 6 | 1.146 | 24.2 | 1.146 | 24.2 |
| 5 | 1.200 | 9.3 | [2] 0.998 | 68.7 |
| 4 | 1.218 | 8.2 | 1.117 | 39.7 |
| 3 | 1.235 | 7.6 | [2] 1.058 | 66.4 |
| 2 | 1.250 | 7.1 | 1.16 | 28.3 |
| 1 | 1.265 | 5.8 | [2] 1.09 | 64.4 |
| Bottom | 1.275 | | 1.18 | |
| Total absorbed | | 612.5 | | 842.0 |

[1] All acid added here.
[2] Acid added.
Extract Sat.—Extract saturation.
Abs./Hr.—Absorbed per hour.

By feeding only part of the fresh acid at the top of the absorber, the amount of absorption or extent of extract saturation may be somewhat diminished on the mid-section trays. Proceeding downwardly in the tower, a point is reached where the rate of absorption would tend to decrease rapidly, e. g. about the ninth plate. By the addition of a second portion of the fresh acid by line 37 at the 5th tray from the bottom to reduce the extract saturation the absorption rate is increased. Similarly, further addition of fresh acid, e. g. at the 3rd and 1st tray by lines 38 and 39 or at as many points as are necessary may be made to level off the extract saturation and maximize use of the lower part of the absorber.

The compared values in the table show how the multipoint addition of the acid increases the total absorption capacity from 612.5 to 842.0 moles $C_2H_4$/Hr.

Instead of adding $H_2SO_4$ at points in the lower part of the absorber tower 21, other mineral acid having strong affinity for water, e. g. oleum or $SO_3$, can be injected to promote the absorption. The $SO_3$ or oleum are capable of decreasing the concentration of free water which is formed on the upper trays.

From the comparisons that have been made, the addition of acidic substances which act to combine with the free water in the latter stages of the absorption provides a more nearly uniform rate of absorption in the lower part of the tower. When operating without the addition of acid in the lower part of the absorber tower, it is difficult if not impossible to realize the increased amount of absorption on account of the high peak rates set up at the midsection and consequent limitations on cooling to avoid degradation.

With the operations of the present invention a positive control of absorption on each tray below the midsection can be obtained for the portions of fresh acid can be injected at any number of points. By maintaining the absorption rate at a desired level, the total amount of absorption is increased for any given residence period. This is of benefit because a prolonged residence period increases the formation of carbonaceous degradation products which give rise to fouling of the absorption and acid concentration systems.

While the principles of this invention have been explained in detail mainly with respect to the absorption of ethylene, it is to be understood that the principles apply to the absorption of other higher olefins, such as propylene, butylenes, and amylene. Also, in place of sulfuric acid, other strong acid substances, such as sulfur trioxide, oleum, phosphoric acid, and the like, having ability to combine with the free water may be used. Various reactor or absorber systems having two or more stages may be employed instead of a vertical plate tower type of absorber.

In any multistage absorber in which the gaseous olefin to be absorbed is passed countercurrent to the absorbing acid, it is advantageous to employ the principle of recycling a portion of the extract at the end of an initial stage where the absorption rate tends to reach a maximum then begins to drop rapidly and to inject additional portions of acid into the remaining extract that is passed through a subsequent stage countercurrent to the olefin.

The invention described affords a method of controlling contact time, as well as rate of absorption and absorption temperature. The total residence time is divided into a number of stages where the olefin-bearing gas is recontacted with extract. By thus permitting a more regulated extraction in more stages, more plates can be used after peak absorption to continue close to peak absorption at a safe temperature level. Otherwise, the peak absorption rises to an excessively high point then has to be allowed to decline sharply to a low level. At the excessively high rate of absorption, the temperature exceeds a safe upper limit, such as 190° F., and this leads to formation of carbon.

The described invention is claimed as follows:

1. In absorption of an oefin by a countercurrent stream of a strong mineral acid, the steps which comprise supplying additional strong mineral acid to a resulting acid extract of the olefin absorbed in the acid stream after the acid extract reaches approximately a maximum absorption rate for the olefin, and passing the acid extract containing the added acid into contact with more of the olefin to be absorbed at a maintained high rate of absorption.

2. In absorption of a gaseous olefin by strong sulfuric acid wherein a stream of the gaseous olefin is passed countercurrent to a stream of the acid mixed with extract of the absorbed olefin through a number of absorption stages, the steps which comprise withdrawing a portion of the acid extract formed by the olefin absorbed in the acid at an intermediate stage where the rate of absorption is near a maximum, recycling thus withdrawn acid extract to a stage where fresh sulfuric acid is brought into contact with the olefin gas stream and where absorption of the olefin from the gas stream is being terminated, injecting additional controlled amounts of strong mineral acid at spaced points into the remaining acid extract stream that is passed from said intermediate stage through subsequent absorption stages countercurrent to the olefin gas stream to maintain absorption rates as high in the subsequent stages as in absorption stages preceding said intermediate stage.

3. In absorption of gaseous ethylene from a gaseous stream by an absorbing sulfuric acid stream flowing countercurrent thereto, the steps which comprise bringing a stream of fresh sulfuric acid into contact with the olefin gas stream where absorption of the olefin from the gas stream is being terminated, cooling the acid stream containing absorbed ethylene in stages to maintain the acid stream at a temperature within the range of 160° to 190° F. as the rate of absorption of the olefin from the gas stream by the acid extract is near a maximum, withdrawing a portion of the acid extract at an intermediate stage where the rate of absorption is near a maximum, adding fresh strong mineral acid to a remaining part of the acid extract stream as it is passed from said intermediate stage into subsequent stages of contact with the gas stream having a higher concentration of ethylene.

4. In the process defined by claim 3, injecting said fresh strong mineral acid at a plurality of spaced points where the rate of absorption tends to decrease in said subsequent stages as the extract saturation rises to above 1 mole of ethylene per mole of sulfuric acid in order to keep the saturation of the acid extract lowered to below 1.2 moles of ethylene per mole of sulfuric acid and thereby increase the rate of absorption toward said maximum at said spaced points.

5. In absorption of ethylene by an absorbing acid stream flowing countercurrent to a gaseous stream containing the ethylene, the steps which comprise introducing into one end of an absorption zone sulfuric acid of 93 to 99% strength to form said acid stream, cooling the acid stream containing extracted ethylene in stages to maintain the acid stream within a narrow range of 160° to 190° F. as the rate of ethylene absorption by the acid reaches a peak then begins to decrease, then adding fresh portions of 93 to 99% sulfuric acid to the extract which has reached approximately maximum rate of absorption in order to lower the saturation of the acid and increase the absorption rate of the ethylene by the acid as it is passed into further contact with more ethylene gas.

References Cited in the file of this patent

UNITED STATES PATENTS

| | | |
|---|---|---|
| 2,145,025 | Isham et al. | Jan. 24, 1939 |
| 2,350,558 | Kerns et al. | June 6, 1944 |
| 2,414,737 | Heinrich | Jan. 21, 1947 |
| 2,474,588 | Morrell et al. | June 28, 1949 |
| 2,683,731 | Atwood | July 13, 1954 |